Patented Sept. 4, 1923.

1,467,105

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed March 25, 1922. Serial No. 546,862.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for cellulose ethers and to compositions produced by the aid of such solvents. One object of the invention is to provide a solvent which will readily dissolve cellulose ethers and make as strong solutions as may be required in the varnish and plastic arts, including solutions sufficiently viscous for film manufacture. Another object of the invention is to provide cellulose ether compositions which may be made into strong flexible transparent film. Other objects will hereinafter appear.

I have discovered that these objects may be attained by mixing ethylene trichlorid with certain alkyl compounds and by dissolving cellulose ether in the mixture. This mixture has a much greater solvent action than the sum of the solvent actions of its constituents when used alone. The alkyl compounds which I may employ are the monohydroxy aliphatic alcohols containing less than six carbon atoms, acetates of such alcohols, acetone, and mixtures of these, and I designate these by the expression, a compound based upon a monohydroxy aliphatic alcohol containing less than six carbon atoms. In the preferred embodiments of my invention, I prefer to use the more volatile of these compounds, such as methyl alcohol, ethyl alcohol, methyl acetate, ethyl acetate, or acetone.

By way of example, I may mix from 10 to 90 parts by weight of ethylene trichlorid with 90 to 10 parts of one of said alkyl compounds like ethyl alcohol. A mixture of ethylene trichlorid and ethyl alcohol in equal proportions by weight yields an excellent liquid solvent. For instance, this solvent will dissolve from ¼ to ⅓ (say ⅕) of its own weight of ethyl cellulose insoluble in water under ordinary temperatures, to form a thick viscous flowable solution suitable for film manufacture in the usual way. When ethylene trichlorid alone or ethyl alcohol alone is mixed with ¼ to ⅓ of its own weight of said ether, a flowable solution is not obtained.

Other substances which impart useful properties to the film may be added to the flowable composition, such, for example, as triphenyl or tricresyl phosphate, camphor monochlor naphthalene, etc. The ingredients are of the commercial type, sufficiently purified to give film or other product having the desired freedom from color. On account of its relatively higher boiling point, ethylene trichlorid evaporates more slowly, and sufficient amounts of it remain in the film or product to increase the useful properties of the latter.

Having thus described my invention, what I claim as new and desire to secure by Letters Patent is:

1. A composition of matter comprising cellulose ether dissolved in a mixture of ethylene trichlorid and a liquid compound which coacts with said ethylene trichlorid to give said mixture greater solvent action on the cellulose ether than the sum of the solvent actions of its said constituents used alone, said liquid compound being based upon a monohydroxy aliphatic alcohol containing less than six carbon atoms.

2. A composition of matter, comprising cellulose ether, ethylene trichlorid and ethyl alcohol.

3. A composition of matter, comprising cellulose ether dissolved in a mixture of equal parts of ethylene trichlorid and ethyl alcohol.

4. A composition of matter comprising cellulose ether dissolved in a mixture of 10 to 90 parts of ethylene trichlorid and 90 to 10 parts of a liquid compound which coacts with said ethylene trichlorid to give said mixture greater solvent action on the cellulose ether than the sum of the solvent actions of its said constituents used alone, said liquid compound being based upon a monohydroxy aliphatic alcohol containing less than six carbon atoms.

5. A viscous, flowable, film-forming composition, comprising a mixture of ethylene trichlorid and a liquid compound which coacts with said ethylene trichlorid to give said mixture greater solvent action on the cellulose ether than the sum of the solvent actions of its said constituents used alone, said liquid compound being based upon a monohydroxy aliphatic alcohol containing less than six carbon atoms, said solvent mixture containing water-insoluble ethyl cellulose equal to from ¼ to ⅛ the weight thereof.

6. As an article of manufacture, a flowed film containing cellulose ether and ethylene trichlorid.

Signed at Rochester, New York, this 17th day of March 1922.

STEWART J. CARROLL.